United States Patent Office 3,070,582
Patented Dec. 25, 1962

3,070,582
POLYADDITION PRODUCTS OF PHOSPHINES WITH UNSATURATED SILANES
Klemens Gutweiler, Mainz, and Heinz Niebergall, Frankfurt am Main, Germany, assignors to Shell Oil Company, New York, N.Y., a corporation of Delaware
No Drawing. Filed Mar. 15, 1960, Ser. No. 15,040
Claims priority, application Germany Mar. 23, 1959
14 Claims. (Cl. 260—80)

This invention relates to copolymers of chains containing phosphorus, carbon and silicon. More particularly, this invention relates to such polymers which are prepared from primary phosphines and ethylenically unsaturated organo silicon compounds.

It is known that compounds containing phosphorus tend to impart flame resistance to resinous materials and that compounds containing silicon tend to be heat stable. It has also been long recognized that heat stability and chemical stability are valuable properties for resinous materials, and considerable effort has been expended to find resinous materials having such desirable properties.

It is a primary object of the present invention to provide a class of resinous materials having such desirable properties, and which are useful either by themselves or in physical or chemical combinations with other resinous materials.

These and other objects are accomplished by the present invention, which provides novel copolymers with chains containing phosphorus, carbon and silicon, which are the reaction products of organo silanes having two ethylenically unsaturated groups and primary phosphines.

The reaction takes place in the presence of a non-oxidizing polymerization catalyst to provide addition copolymers in which the olefinically unsaturated groups of the silane add to the hydrogens of the phosphine. Thus, it is important to have a primary phosphine (i.e. one having two hydrogens) and an organo silane containing at least two ethylenically unsaturated groups. The addition takes place by having a carbon of the unsaturated group replace the hydrogen on the phosphorus atom with the hydrogen satisfying the other valence provide the loss of the double bond. In this way, chains are formed having molecular weights which may be above 1000 and are often above 2000.

In its preferred form, the organo silane will be the formula shown in the reaction given below and it is believed that the reaction takes place as follows

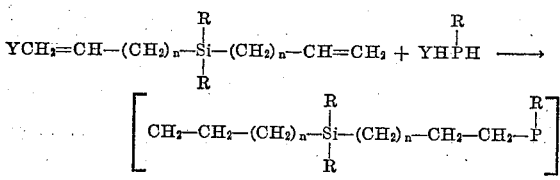

In the above reaction, n represents an integer from 0 to 6 and R is selected from the class consisting of alkyl, cycloalkyl, alkaryl, aryl, and aralkyl groups. In general, the groups will contain less than 8 carbon atoms although larger groups are believed to react in accordance with the present invention. Preferably, the alkenyl attached to the silicon will be the vinyl group because more stable materials are obtained when the vinyl group is used. Similarly, the preferred group for R are phenyl, methyl, and ethyl. These R groups are preferred not only for improved stability but also from the standpoint of availability and low cost.

Examples of preferred organo silanes that might be used are diphenyldivinyl silane, phenylmethyldivinyl silane, phenylethyldivinyl silane, diphenyldiallyl silane, dimethyldiallyl silane, diethyldiallyl silane, dimethyldivinyl silane, diethyldivinyl silane, dicyclohexyldivinyl silane, dicyclohexyldivinyl silane, dipropyldiallyl silane, dihexyldivinyl silane, ditolyldivinyl silane, di(phenylethyl)divinyl silane, and diphenyldi(3,4-butenyl) silane. Other groups which are considered operable would include di(octaphenyl)divinyl silane, dinaphthyldivinyl silane, and didecyldiallyl silane. However, such materials are not so readily available as the preferred class mentioned above, nor do they provide as satisfactory products from the standpoint of stability.

In general, any primary phosphine may be used and such a phosphine may be represented by the formula $RPH_2$ where R is as defined above. Preferably, the R group is not unduly large and will be of, say, less than 8 carbon atoms. Examples of suitable phosphines include phenyl phosphine, methyl phosphine, ethyl phosphine, butyl phosphine, octyl phosphine, tolyl phosphine, xylyl phosphine, cyclohexyl phosphine, phenylmethyl phosphine and phenylethyl phosphine.

The addition products obtained vary depending upon the particular components utilized, although the addition reaction takes place in all cases to form valuable resinous materials. For example, the addition products of phenyl phosphine to diallyldialkenyl silanes form viscous oils while the addition products of phenyl phosphine to diphenyldialkenyl silanes form a solid resinous material having a softening point of, say, from 50 to 60° C. In this class, the diphenyldivinyl silane is particularly outstanding in that the addition to phenyl phosphine occurs most readily and forms a particularly stable material.

The reaction temperature may vary within wide limits depending upon the specific monomers and the activity of the catalysts utilized. In fact, where high temperatures are used, the high temperature may act as the non-oxidizing catalyst and provide the desired polymerization without additional catalyst. Such temperatures are generally from, say, 80 to 140° C. and higher up to, say, 250° C. However, when ultra violet light is used as the initiator, the reaction may be carried out at temperatures less than room temperature although it is more convenient to use ambient temperatures. Similarly, if the initiator is a non-oxidizing free radical yielding substance, lower temperatures may be utilized, but some heating may be desired to increase the reaction rate. The reaction time is not critical and will usually vary from, say, one hour to fifty hours or more depending on the temperatures, catalyst and specific reactants used.

If desired, a solvent may be added to assist in temperature control or to assist in dissolving the reactants in one another. When a solvent is used, it is possible to use any solvent which is inert to the polymerization reaction. For example, suitable solvents include paraffin hydrocarbons such as petroleum ether and aromatic solvents such as benzene, toluene, xylene and chlorobenzene.

The preferred initiator or polymerization catalyst include ionizing irradiation such as UV light and an aliphatic azo compound having both nitrogens attached directly to carbon atoms of an aliphatic chain or both. Preferably, at least one of the carbons is tertiary and one of the carbons bonded to satisfy tertiary carbon has its remaining valence satisfied only by oxygen or nitrogen. Examples of these preferred azo compounds include alpha,alpha' - azodiisobutyronitrile, alpha-alpha'-azobis-(alpha,gamma - dimethylvaleronitrile), alpha,alpha'-azobis(alpha - methylbutyronitrile), alpha,alpha' - azobis(alpha-ethylbutyronitrile), alpha,alpha' - azobis(alpha-methylenanthonitrile), alpha,alpha' - azobis(alpha-phenylpropionitrile), alpha,alpha'-azobis(alpha-cyclopropylpropionitrile), alpha,alpha' - azobis(alpha - cyclohexylpropionitrile), alpha,alpha' - azobis(alpha - cycloheptylpropionitrile), alpha,alpha' - azobis(alpha-isopropyl-beta-methylbutyronitrile), alpha,alpha'-azobis(alpha,gamma-dimethylcaprinitrile), alpha,alpha'-azobis(alpha-n-butyl-capronitrile), alpha,alpha'-azobis(alpha-isobutyl-gamma-methylvaleronitrile), alpha,alpha'-azobis(alpha-methyl-gamma-carboxy-butyronitrile).

The resultant polymerization products are, depending on the constitution of the starting components and the type of initiation, oils of varying viscosity, tough plastic resins or hard products. The products are very resistant to high temperatures. Their most remarkable property is their flame resistance. When directly contacted with a flame, they only burn above their decomposition point, but are immediately extinguished as soon as they are removed from the flame.

The new products, as insulators resisting high temperatures, are extremely valuable in fields in which thermal and chemical resistance are very necessary. The products may also be used as textile treating agents, for the preparation of coatings, plasticizers, stabilizers, lubricant additives and hydraulic oils.

The invention is more fully demonstrated by the following illustrative examples.

Example I 2.12 grams of phenylphosphine were mixed with 2.70 grams of dimethyldiallyl silane in a $CO_2$ atmosphere in a quartz tube. After the quartz tube has been hermetically sealed with a glass stopper, the reaction mixture was radiated for 27 hours with UV light. The resultant viscous mixture was dissolved in benzene, and then the benzene was distilled off under reduced pressure with the temperature of the oil bath being increased to 180° C. The resultant product was finally kept at 100° C. for 2 hours at a pressure of 1 mm. Hg. The product then had a phosphorous content of 13.7% (calculated 12.4%) and a silicon content of 11.2% (calculated 10.5%). This product was a clear, colorless oil which did not decompose at temperatures of up to 360° C. Yield 80% of theory.

Example II (a) Phenylphosphine and diethyldiallyl silane were introduced into a quartz test tube under nitrogen in a molar ratio of 1:1, and exposed to UV light. Both components did not clearly dissolve into each other in the cold and the mixture was slightly turbid. In UV light they cleared up after some time. After 4 to 5 hours, there was a noticeable increase in viscosity and simultaneous contraction of volume. The radiation was continued for 48 hours. In order to free the addition product from traces of monomers, a vacuum of 1.5 mm. Hg was applied under a nitrogen atmosphere at a bath temperature of 250° C. (diethyldiallyl silane boiling point (34 mm.) 91°–93° C., phenyl phosphine boiling point (17 mm.) 49°–51° C.). A distillate was not obtained, but it was observed that white clouds were given off which did not condense with water cooling. The addition product is a clear, colorless and highly viscous oil. Average molecular weight 2210. Yield 85% of theory.

If this oil is heated in an open test tube containing an immersed thermometer to 360° C. and allowed to cool, no change in color or viscosity can be seen. If, however, the product is heated at 250° C. while introducing air (in an open test tube), decomposition products begin to escape after 20 minutes which turn brown on contact with the atmosphere. After 4 hours the product is colored dark brown. The dark-brown product is still liquid at 250° C. and solidifies to a hard mass when cooled.

In order to examine the effect of addition conditions on the thermal stability of the addition products, the addition was carried out under modified conditions.

(b) The procedure of Example II(a) is repeated except that the addition in UV light is at 5° C., and the duration of radiation is 25 hours. In order to purify the product, a vacuum of 2 mm. Hg was applied for one hour at 250° C. bath temperature under a nitrogen atmosphere. On distillation there was a loss of about 10% of material.

This addition product is a clear, colorless (yield 90% of theory). Its viscosity is less than that of the product of Example II(a). If it is heated at 250° C. while introducing air, brown decomposition products are formed only on the surface of the liquid after two hours. The liquid itself turns light yellow, and brownish red after 8 hours.

(c) The procedure of Example II(a) is repeated except that the addition in UV light is at 110° C., and the duration of radiation is 30 hours. Purification was carried out in the same manner as with the preceding products, except that the bath temperature was kept at 300° to 330° C. for 45 minutes. At this temperature white, non-condensing vapors passed over. There was a 10% loss of material (i.e. yield 90% of theory).

The addition product did not change color during distillation, it is a clear, colorless viscous oil having a viscosity greater than that of either Example II(a) or II(b). On heating to 250° C. while introducing air, highly colored decomposition products were formed after 25 minutes. The material turned dark brown after 3½ hours.

(d) The procedure of Example II(a) is repeated except that azodi-isobutyronitrile is used as the catalyst at a temperature of 80° C. for a period of 26 hours. The addition product was purified in the same manner as in Examples II(a), (b), and (c) above.

The addition product was also clear, colorless viscous oil having an average molecular weight of 1140 (yield 80% of theory). This product also gave brown decomposition products after 25 minutes when heated to 250° C. while introducing air. The product was highly colored after 8 hours but was still transparent.

Example III

Phenylphosphine and diethyldivinyl silane were reacted with UV light as initiator according to the procedure of Example II except that radiation was applied once at room temperature for 48 hours and on a second occasion at 5° C. for 24 hours. From the volume contraction observed, the diethyldivinyl silanes appeared to add more rapidly than the diethyldiallyl silanes. These products were also purified by applying a vacuum of from 1.5 to 2 mm. Hg at a bath temperature of 250° C. under a nitrogen atmosphere. Yield 88% of theory.

The addition product produced by 48 hours of radiation at room temperature was a light yellow, viscous oil after purification. When heated at 250° C. while introducing air, it turned yellowish after 3 hours and dark brown after 5½ hours; yet it was still transparent in a thin layer.

The product obtained by radiation for 24 hours at 5° C. was dissolved in 10 ml. of benzene, precipitated with 90 ml. of petroleum ether and allowed to stand for 48 hours at room temperature. Two fractions were obtained in this way. Fraction A remained in solution in the benzene-petroleum ether mixture. Fraction B deposited on the bottom and walls of the vessel in the form of oil. The solvent was removed from both fractions by distillation under a nitrogen atmosphere at a bath temperature of 250° C. and 2 mm. Hg.

Fraction A is a cloudy, highly viscous colorless oil, fraction B is hard, plastic, turbid and light yellow. Fraction A turned light yellow after 45 minutes and orange yellow after 5 hours. After 6 hours it was reddish-brown, still transparent, and after 7 hours dark reddish-brown and almost opaque. Brown streaks formed on the surface of fraction B after only 30 minutes. After 5 hours it was dark brown and opaque.

Example IV

Phenylphosphine was added to dimethyldiallyl silane in two runs using UV light and radiation at room temperature for 46 hours in one run and radiation at 5° C. for 24 hours in another. The products were purified by applying a vacuum of 2 mm. Hg at a bath temperature of 250° C. The final products were colorless, clear, viscous oils having an average molecular weight of 945. Yield 91% of theory.

Example V (a) A 1:1 molar ratio of phenylphosphine and diphenyldivinyl silane were reacted in UV light at room temperature for a period of 21 hours. After a radiation of only 6 hours the highly viscous product was formed but the radiation was extended to 21 hours to provide more complete polymerization. The crude product was purified by dissolving in benzene and reprecipitation with petroleum ether. After some hours, the products were deposited in the form of highly viscous oils and the petroleum ether was decanted. Finally the solvent and precipitant was entirely removed by distillation under a nitrogen atmosphere at 2 mm. mercury and a bath temperature of 250° C. The average molecular weight of the product was 2850 and it yielded 98% theory. The purified product is a plastic, tough and colorless resin which turns dark brown when heated for 5 hours at 250° C. while introducing air.

(b) A 1:1 molar ratio of phenylphosphine and diphenyldiallyl silane were reacted in UV light plus 1% by weight of azodi-isobutyronitrile by radiation for 14 hours. The resultant product is clear, light yellow, plastic and tough. When heated to 250° C., while introducing air, it turns brown after 3 hours and is dark brown in color after 4 hours. Average molecular weight is 1930. Yield: 92% of theory.

(c) A 1:1 molar ratio of phenylphosphine and diphenyldiallyl silane were reacted in the presence of 1% by weight of azodiisobutyronitrile for 21 hours. The product is a colorless, tough resin. Yield was 90% of theory.

(d) A 1:1 molar ratio of phenylphosphine and diphenyldiallyl silane are treated with UV light at 5° C. for 24 hours. The product obtained is colorless, plastic and tough. Its consistency is softer than the products referred to above. When the product is heated to 250° C., while introducing air, it is light yellow in color after 30 minutes and orange after 4½ hours. Average molecular weight is 1390. Yield was 92% of theory.

Example VI

A 1:1 molar ratio of phenylphosphine and diphenyldivinyl silane was radiated in UV light. The monomer solution solidified to a hard, colorless and plastic mass after after 5 hours. This addition product is harder than the addition products of diphenyldiallyl silane and phenylphosphine. Its softening point is about 50° C. Yield was 90% of theory.

When heated to 250° C. while introducing air, it clears up after being heated for only 2 hours, after 4 hours it is yellow, after 6 hours orange, and after 7 hours reddish brown. After heating for 11 hours, there was no further discoloration of the product. At 250° C. it is a viscous liquid which on cooling solidifies to a yellowish-brown transparent mass. There were no decomposition products on the wall of the test tube.

Example VII

A 1:1 molar ratio of butylphosphine and diphenyldiallyl silane was treated with UV light at room temperature for 24 hours. The resultant product was turbid, the product was purified as in previous examples in an atmosphere of nitrogen and a temperature of 250° C. at 2 mm. of pressure. After one hour at 250° C. while introducing air, the product was clear and yellowish, after 5 hours it was light brown, after 6 hours decomposition products were formed on the wall of the test tube, and after 9 hours it turned dark brown. The product was not completely decomposed and solidified at room temperature to a mass which was still partly honey-yellow in color. Its consistency is harder than that of the original product. Yield was 88% of theory.

The addition product obtained by initiation with UV light and 1% by weight of azodi-isobutyronitrile or by radiation for 20 hours has the same properties.

Example VIII

A 1:1 molar ratio of butylphosphine and diphenyldivinyl silane was treated with UV light at room temperature for 24 hours. The product was purified as in previous examples in an atmosphere of nitrogen and a temperature of 250° C. at 2 mm. pressure. The addition product obtained was cloudy, soft and somewhat yellowish tinged (yield 89% of theory). When this product was allowed to stand for several days, the surface solidification was not so noticeable as in the case of the addition products of butylphosphine to diphenyldiallyl silane. Moreover, this product was also more stable when heated to 250° C. while introducing air. After heating for 5 hours the addition product is first turned yellow, whereas the products of Example VII has already turned reddish brown. On further heating the color soon changes to reddish brown. Moreover, in the case of this addition product, no brown decomposition products occur on the wall of the test tube above the surface of the material. After heating for 8 hours the product is opaque in a thicker layer and solidifies at room temperature to a honey-yellow, transparent and plastic mass in a thinner layer.

We claim as our invention:

1. Novel copolymers having a molecular weight above about 1000 and consisting essentially of phosphorus, carbon and silicon, which are the reaction products of organo silanes having the formula

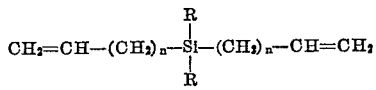

and $RPH_2$ where R is selected from the class consisting of alkyl, cycloalkyl, alkaryl, aryl, and aralkyl groups, and $n$ is an integer from 0 to 6.

2. The copolymers as defined in claim 1 in which $n$ is 0.

3. Novel copolymers having a molecular weight above about 1000 and consisting essentially of phosphorus, carbon and silicon, which are the reaction products of phenyl phosphine and dimethyl diallyl silane.

4. Novel copolymers having a molecular weight above about 1000 and consisting essentially of phosphorus, carbon and silicon, which are the reaction products of phenyl phosphine and diethyl diallyl silane.

5. Novel copolymers having a molecular weight above about 1000 and consisting essentially of phosphorus, carbon and silicon, which are the reaction products of phenyl phosphine and diethyl divinyl silane.

6. Novel copolymers having a molecular weight above about 1000 and consisting essentially of phosphorus, carbon and silicon, which are the reaction products of phenyl phosphine and diethyl divinyl silane.

7. Novel copolymers having a molecular weight above about 1000 and consisting essentially of phosphorus, carbon and silicon, which are the reaction products of phenyl phosphine and diphenyl diallyl silane.

8. Novel copolymers having a molecular weight above about 1000 and consisting essentially of phosphorus, carbon and silicon, which are the reaction products of phenyl phosphine and diphenyl divinyl silane.

9. Novel copolymers having a molecular weight above about 1000 and consisting essentially of phosphorus, carbon and silicon, which are the reaction products of butyl phosphine and diphenyl divinyl silane.

10. Novel copolymers having a molecular weight above about 1000 and consisting essentially of phosphorus, carbon and silicon, which are the reaction products of butyl phosphine and diphenyl diallyl silane.

11. A process for the preparation of copolymers having chains consisting essentially of phosphorus, carbon and silicon, which comprises reacting an organo silane having the formula

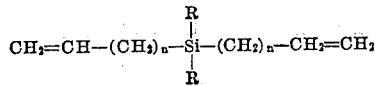

with an organo phosphine $RPH_2$ with R being a member of the class consisting of alkyl, cycloalkyl, alkaryl, aryl, and aralkyl, and $n$ is an integer from 0 to 6 in contact with a non-oxidizing polymerization catalyst selected from the group consisting of ionizing irradiation and aliphatic azo compounds in which both nitrogens are attached directly to a carbon atom of an aliphatic chain.

12. The process defined in claim 11, in which $n$ is 0.

13. The process defined in claim 11, in which ultra violet light is used as the polymerization catalyst.

14. The process defined in claim 11, in which the catalyst is an aliphatic azo compound having both nitrogens attached directly to a tertiary carbon atom of an aliphatic chain.

References Cited in the file of this patent
UNITED STATES PATENTS

| | | |
|---|---|---|
| 2,835,690 | Prober | May 20, 1958 |
| 2,843,615 | Linville | July 15, 1958 |